(12) United States Patent
Tatsuma et al.

(10) Patent No.: US 8,740,126 B2
(45) Date of Patent: Jun. 3, 2014

(54) WEBBING TAKE-UP DEVICE

(75) Inventors: Atsushi Tatsuma, Aichi-ken (JP); Akira Sumiyashiki, Aichi-ken (JP); Hitoshi Takamatsu, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 700 days.

(21) Appl. No.: 12/952,965

(22) Filed: Nov. 23, 2010

(65) Prior Publication Data

US 2011/0127363 A1 Jun. 2, 2011

(30) Foreign Application Priority Data

Nov. 27, 2009 (JP) ................................. 2009-270503
Sep. 30, 2010 (JP) ................................. 2010-221881

(51) Int. Cl.
*B60R 22/41* (2006.01)
*B60R 22/405* (2006.01)

(52) U.S. Cl.
USPC ..................................... 242/383.1; 242/383.2

(58) Field of Classification Search
USPC .................... 242/383.1–383.5; 280/806, 807; 297/478
See application file for complete search history.

(56) References Cited

U.S. PATENT DOCUMENTS

| | | | | |
|---|---|---|---|---|
| 3,862,726 A | * | 1/1975 | Ulrich et al. | 242/383.1 |
| 4,485,986 A | * | 12/1984 | Sugimoto | 242/383.1 |
| 5,480,105 A | * | 1/1996 | Fujimura et al. | 242/383.2 |
| 6,585,184 B1 | * | 7/2003 | Park et al. | 242/383.2 |
| 2002/0005448 A1 | * | 1/2002 | Sumiyashiki | 242/383.2 |
| 2007/0290091 A1 | * | 12/2007 | Mori | 242/383.1 |
| 2008/0210802 A1 | * | 9/2008 | Sumiyashiki | 242/379.1 |

FOREIGN PATENT DOCUMENTS

| | | |
|---|---|---|
| CN | 101148164 A | 3/2008 |
| JP | H09323618 | 2/1997 |
| JP | 2008-24284 A | 2/2008 |

OTHER PUBLICATIONS

Office Action issued in corresponding Chinese patent application No. 201010566059.9 mailed on Aug. 23, 2012 and partial English Translation.
Japanese Office Action and notice of reasons for rejection dated Dec. 17, 2013.

* cited by examiner

*Primary Examiner* — Sang Kim
*Assistant Examiner* — Scott Haugland
(74) *Attorney, Agent, or Firm* — Roberts Mlotkowski Safran & Cole, P.C.

(57) ABSTRACT

A webbing take-up device comprising a spool and a locking unit having a locking unit main body having a rotational acceleration detecting unit, wherein the rotational acceleration detecting unit comprises a second rotating body; a rotation transmission member provided at the second rotating body; an inertial mass body having a pressing portion and provided at the second rotating body; a biasing means provided at the second rotating body; and a retaining portion provided at the second rotating body to pinch the rotation transmission member together with the inertial mass body biased by the biasing means, thereby retaining the rotation transmission member in a state in which the rotation transmission member does not engage with the first rotating body, and to release retention of the rotation transmission member when relative rotation is produced between the second rotating body and the inertial mass body.

5 Claims, 7 Drawing Sheets

WEBBING TAKE-UP DEVICE

CROSS-REFERENCE TO RELATED APPLICATION

This application claims priority under 35 USC 119 from Japanese Patent Applications, No. 2009-270503 filed on Nov. 27, 2009 and No. 2010-221881 filed on Sep. 30, 2010, the disclosure of which is incorporated by reference herein.

BACKGROUND

1. Technical Field

The present invention relates to a webbing take-up device which takes up a webbing belt which constrains a passenger's body and stores the webbing belt in a spool, and particularly, to a webbing take-up device which has a locking unit which can regulate the rotation of the spool when the spool has rotated in a pull-out direction at an acceleration of a predetermined value or more.

2. Related Art

A webbing take-up device which constitutes a seat belt apparatus of a vehicle includes a locking mechanism which operates at the time of abrupt deceleration or the like of the vehicle. As this type of locking mechanism, there are a so-called "VSIR mechanism" which operates to detect the acceleration (deceleration) when a vehicle decelerates abruptly, and a so-called "WSIR mechanism" which operates when a spool rotates at high speed in a pull-out direction.

For example, in the "WSIR mechanism" in the webbing take-up device disclosed in Japanese Patent Application Laid-Open No. 2008-24284, when a V gear rotates at high speed in the pull-out direction along with the spool, an inertia mass which remains in position due to its inertia consequently rotates in a take-up direction relative to the V gear against the biasing force of a return spring, and the inertia mass which has rotated in the pull-out direction relative to the V gear in this way presses a W pawl. The W pawl pressed by the inertia mass meshes with ratchet teeth formed on an inner peripheral portion of a gear ring, and rotates the gear ring and a sensor gear in the pull-out direction. The sensor gear which has rotated in the pull-out direction oscillates a locking pawl to make the locking pawl engage ratchet teeth of a locking base and lock the locking base which rotates in the pull-out direction along with the spool. This regulates the rotation of the spool in the pull-out direction indirectly.

SUMMARY

In the "WSIR mechanism", the turning of the inertia mass by the biasing force of the return spring is regulated by a stopper provided at the V gear. However, the turning of the W pawl itself is not regulated. For this reason, for example, when the V gear rotates due to the pulling-out of the webbing belt from a spool or take-up of the webbing belt to the spool in normal condition, the W pawl may move and collide with the inertia mass, generating noise.

In consideration of the above circumstances, a webbing take-up device which can prevent or suppress unnecessary movement of a rotation transmission member such as a W pawl in a locking unit is obtained in the present invention.

A webbing take-up device related to a first aspect of the invention includes: a spool having a longitudinal base end of a webbing belt locked thereto and taking up the webbing belt by rotation of the spool in a take-up direction; and a locking unit having a locking unit main body that is operated by rotation of a first rotating body in a predetermined direction so as to regulate rotation of the spool in a pull-out direction that is opposite to the take-up direction, and having a rotational acceleration detecting unit that is operated by rotation of the spool in the pull-out direction at an acceleration of greater than or equal to a predetermined value so as to rotate the first rotating body in the predetermined direction, wherein the rotational acceleration detecting unit comprises: a second rotating body that rotates in the predetermined direction due to rotation of the spool in the pull-out direction; a rotation transmission member provided at the second rotating body so as to be capable of being brought closer to and further separated from the first rotating body, and transmitting the rotation of the second rotating body in the predetermined direction to the first rotating body in a state in which the rotation transmission member is engaged with the first rotating body; an inertial mass body having a pressing portion and provided at the second rotating body, and rotating in a direction opposite to the predetermined direction relative to the second rotating body, whereby the pressing portion presses the rotation transmission member to make the rotation transmission member engage with the first rotating body; a biasing means provided at the second rotating body to bias the inertial mass body in the predetermined direction whereby the inertial mass body pressure contacts the rotation transmission member and biases the rotation transmission member via a biasing force so as to move apart from the first rotating body, and the biasing means further allowing relative rotation to be produced between the second rotating body and the inertial mass body against the biasing force when the second rotating body has rotated in the predetermined direction at an acceleration greater than or equal to the predetermined value; and a retaining portion provided at the second rotating body to pinch the rotation transmission member together with the inertial mass body biased by the biasing means, thereby retaining the rotation transmission member in a state in which the rotation transmission member does not engage with the first rotating body, and to release retention of the rotation transmission member when relative rotation is produced between the second rotating body and the inertial mass body.

According to the webbing take-up device of the first aspect of the invention, when the spool rotates in the pull-out direction at an acceleration greater than or equal to a predetermined value and the second rotating body rotates in a predetermined direction, the second rotating body rotates in the predetermined direction relative to the inertial mass body while the inertial mass body stays due to the inertia against the biasing force of the biasing means. When the relative rotation is produced between the second rotating body and the inertial mass body, the inertial mass body presses the rotation transmission member, thereby making the rotation transmission member engage the first rotating body. When the rotation transmission member engages the first rotating body, the rotation of the second rotating body in the predetermined direction is transmitted to the first rotating body via the rotation transmission member, thereby rotating the first rotating body in the predetermined direction. When the first rotating body rotates in the predetermined direction in this way, the locking unit main body which constitutes the locking unit along with the rotational acceleration detecting unit operates to regulate the rotation of the spool in the pull-out direction.

Whereby, in a state of abrupt deceleration of the vehicle, the pull-out of the webbing belt from the spool is regulated, and the body of a passenger who moves to the front direction of the vehicle due to its inertia can be retained by the webbing belt.

The inertial mass body biased by the biasing means is brought into pressure contact the rotation transmission member, thereby biasing the rotation transmission member in a direction that the rotation transmission member moves apart from the first rotating body. Moreover, the rotation transmission member biased in this way is brought into pressure contact with the retaining portion provided at the second rotating body, and the rotation transmission member is pinched and retained between the inertial mass body and the retaining portion. Whereby, when the spool has rotated in the pull-out direction or the take-up direction in a normal state, the rotation transmission member can be prevented from being displaced unnecessarily, and generation of noise resulting from unnecessary displacement of the rotation transmission member can be prevented or effectively suppressed.

A webbing take-up device of a second aspect of the invention is, in the first aspect, a projection may be formed so as to project toward the second rotating body from the rotation transmission member along the direction of a rotation axis of the second rotating body, and the second rotating body may be formed with a hole portion into which the projection enters. The projection is pressure contacted with an inner peripheral portion of the hole portion as the rotation transmission member is pressed by the inertial mass body due to the biasing force of the biasing means, and the inner peripheral portion of the hole portion serves as the retaining portion.

According to the webbing take-up device of the second aspect, the projection formed in the rotation transmission member enters the hole portion formed in the second rotating body, and when the inertial mass body presses the rotation transmission member due to the biasing force of the biasing means, the projection of the rotation transmission member is brought into pressure contact with the inner peripheral portion of the hole portion. Whereby, the rotation transmission member is pinched and retained by the inner peripheral portion of the hole portion and the inertial mass body.

A webbing take-up device of a third aspect of the invention is, in the first and second aspects, at least a portion of the inertia mass body and at least a portion of the retaining portion face each other when the rotation transmission member is retained by the inertia mass body and the retaining portion.

According to the webbing take-up device of the third aspect, since at least a portion of the inertial mass body and at least a portion of the retaining portion face each other, when the inertial mass body presses the rotation transmission member due to the biasing force of the biasing means, the retaining portion support the rotation transmission member from an opposite side of the inertial mass body. Accordingly, the rotation transmission member is prevented from rotating around a contact position with the retaining portion due to a pressure force by the inertial mass body.

A webbing take-up device of a fourth aspect of the invention includes a spool having a longitudinal base end of a webbing belt locked thereto and taking up the webbing belt by rotation of the spool in a take-up direction; and a locking unit having a first rotating body, a locking unit main body and a rotational acceleration detecting unit, the locking unit main body being operated by rotation of the first rotating body in a pull-out direction of the webbing belt so as to regulate rotation of the spool in the pull-out direction, and the rotational acceleration detecting unit being operated by rotation of the spool in the pull-out direction at an acceleration greater than or equal to a predetermined value so as to rotate the first rotating body in the pull-out direction, wherein the rotational acceleration detecting unit includes: a second rotating body that rotates in the pull-out direction due to rotation of the spool in the pull-out direction; a rotation transmission member provided so as to be brought closer to and further separated from the first rotating body, and transmitting the rotation of the second rotating body in the pull-out direction to the first rotating body in a state in which the rotation transmission member is engaged with the first rotating body; an inertial mass body having a pressing portion and rotating relative to the second rotating body rotating in the pull-out direction, whereby the pressing portion presses the rotation transmission member to make the rotation transmission member engage with the first rotating body; a biasing means provided at the second rotating body and biasing the inertial mass body whereby the inertial mass body pressure contacts the rotation transmission member and biases the rotation transmission member via a biasing force so as to move apart from the first rotating body, and the biasing means further allowing relative rotation to be produced between the second rotating body and the inertial mass body against the biasing force when the second rotating body has rotated in the pull-out direction at an acceleration greater than or equal to the predetermined value; and a retaining portion provided at the second rotating body to pinch the rotation transmission member together with the inertial mass body biased by the biasing means, thereby retaining the rotation transmission member in a state in which the rotation transmission member does not engage with the first rotating body, and to release retention of the rotation transmission member when relative rotation is produced between the second rotating body and the inertial mass body.

A webbing take-up device according to the fifth aspect is, in the forth aspect, a projection is formed on the rotation transmission member so as to project toward the second rotating body along the direction of a rotation axis of the second rotating body, the second rotating body is formed with a hole portion into which the projection enters, an inner peripheral portion of the hole portion serves as the retaining portion, and the projection is brought into pressure contact with the inner peripheral portion of the hole portion when the rotation transmission member is pressed by the inertial mass body by the biasing force of the biasing means.

A webbing take-up device according to the sixth aspect is, in the forth aspect, a portion of the inertia mass body and a portion of the retaining portion face each other when the rotation transmission member is retained by the inertia mass body and the retaining portion.

According to the webbing take-up device of the fourth to sixth aspects, unnecessary movement of the rotation transmission member which constitutes the rotational acceleration detecting unit can be prevent or suppressed and noise generated due to the unnecessary movement of the rotation transmission member can be prevent or suppressed.

BRIEF DESCRIPTION OF THE DRAWINGS

Embodiments of the present invention will be described in detail based on the following figures, wherein.

DETAILED DESCRIPTION

Configuration of Present Embodiment

Figure 1:
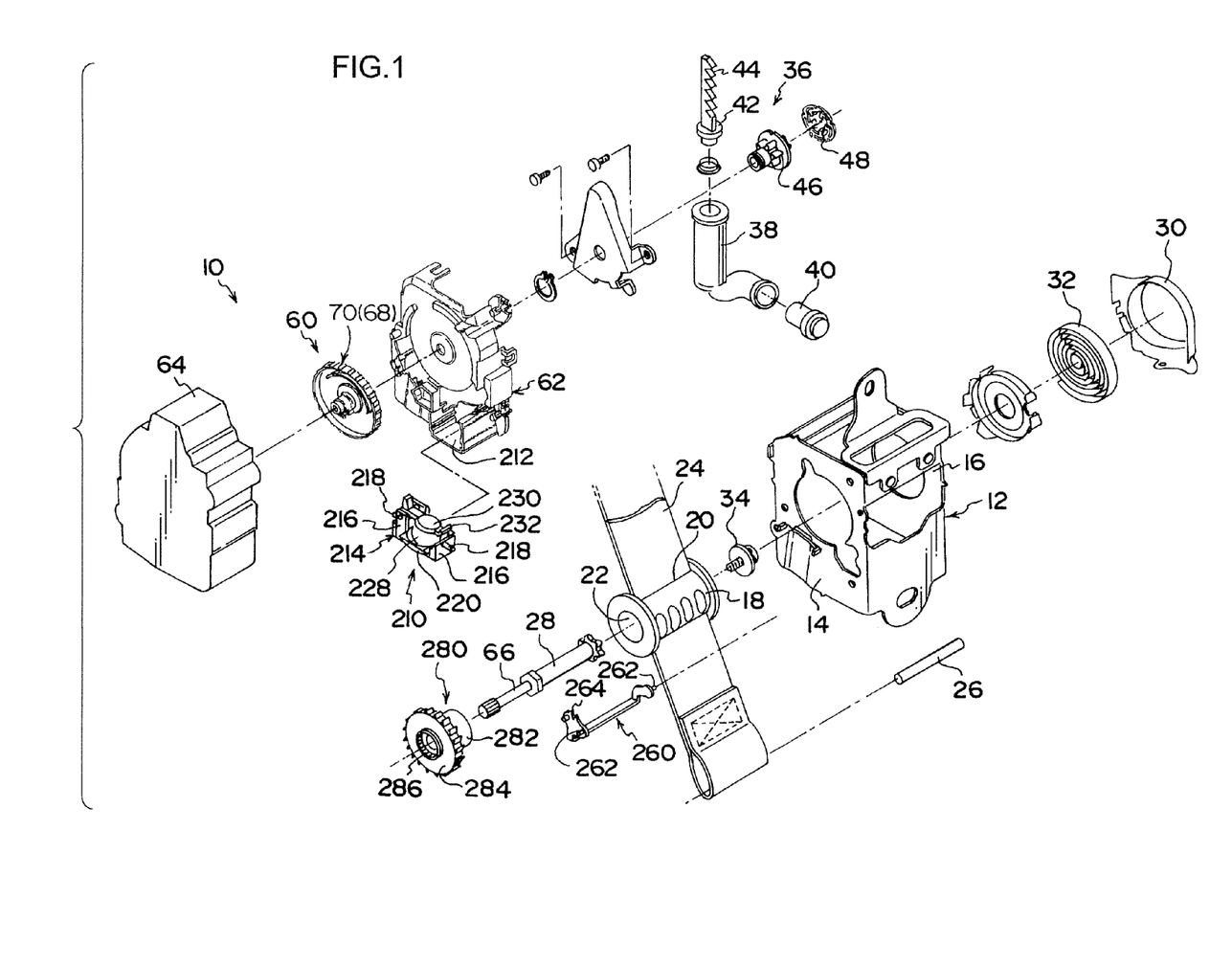
FIG. 1 is an exploded perspective view showing the outline of the overall configuration of a webbing take-up device related to one embodiment of the invention.

The outline of the overall configuration of a webbing take-up device 10 related to the one embodiment of the invention is shown by an exploded perspective view in FIG. 1. The webbing take-up device 10 includes a frame 12. The frame 12 includes the leg plates 14 and 16 which face each other substantially along the longitudinal direction of a vehicle. A spool 18 is provided between the leg plate 14 and the leg plate 16. The spool 18 is formed in a tubular shape the axial direction thereof runs along a direction in which the leg plates 14 and 16 face each other. The spool 18 is formed with an insertion hole 20. The insertion hole 20 opens to an outer peripheral portion of the spool 18 at both ends thereof, and the opening shape thereof is formed in the shape of a slit of which the longitudinal direction runs along the axial direction of the spool 18.

The insertion hole 20 is formed so as to avoid a through-hole 22 which penetrates an axial center portion of the spool 18, and a longitudinal base end of a long belt-shaped webbing belt 24 passes through one end of the insertion hole 20, and is stopped from slipping off by a slip-off stopping shaft 26. The webbing belt 24 is taken up and stored in layers around the outer peripheral portion of the spool 18 when the spool 18 rotates in a take-up direction which is one side around the axis thereof.

A rod-shaped torsion shaft 28 is provided inside the through-hole 22. The end of the torsion shaft 28 on the side of the leg plate 16 is tied to the spool 18 in a state where the torsion shaft is stopped from rotating relatively to the spool 18 within the through-hole 22. Moreover, the end of the torsion shaft 28 on the side of the leg plate 16 passes through the leg plate 16, and projects to the outside of the frame 12.

On the outside of the leg plate 16, a box-shaped spring cover 30 which opens toward the leg plate 16 is fixed to the leg plate 16, and the end of the torsion shaft 28 enters the spring cover 30. Within the spring cover 30, the outside end of a spiral spring 32 in a spiral direction is locked. The inside end of the spiral spring 32 in the spiral direction is mounted on the end of the torsion shaft 28 on the side of the leg plate 16, and is locked to an adapter 34 rotatably supported by the spring cover 30 coaxially with the through-hole 22.

A pretensioner 36 is provided on the outside of the leg plate 14. The pretensioner 36 includes a cylinder 38, and the opening of the cylinder 38 at the base end thereof is mounted with a gas generator 40. When the internal pressure of the cylinder 38 rises due to the pressure of gas produced as the gas generator 40 operates, a piston 42 arranged within the cylinder 38 moves inside the cylinder 38, and a rack bar 44 rotates a pinion 46 in the take-up direction of the webbing belt 24. When the pinion 46 rotates in the take-up direction, a locking base 280 which will be described below is rotated in the take-up direction via a clutch 48.

Moreover, a side of the leg plate 14 is provided with a locking mechanism 60. The locking mechanism 60 includes a sensor holder 62. The sensor holder 62 is formed in the shape of a recess which opens partially toward the leg plate 14 and is fixed to the leg plate 14. A sensor cover 64 is provided on the side of the sensor holder 62 opposite to the leg plate 14. A fitting claw is formed on an outer peripheral portion of the sensor cover 64, and fits to a predetermined portion of the sensor holder 62 and is mechanically coupled to the sensor holder 62. The sensor cover 64 is formed with a tubular bearing, which is not shown, and a shaft portion 66 (refer to FIG. 1) of the torsion shaft 28 which has passed through the sensor holder 62 is rotatably journalled. The shaft portion 66 extends from one end of the torsion shaft 28 coaxially with the torsion shaft 28.

Figure 2:
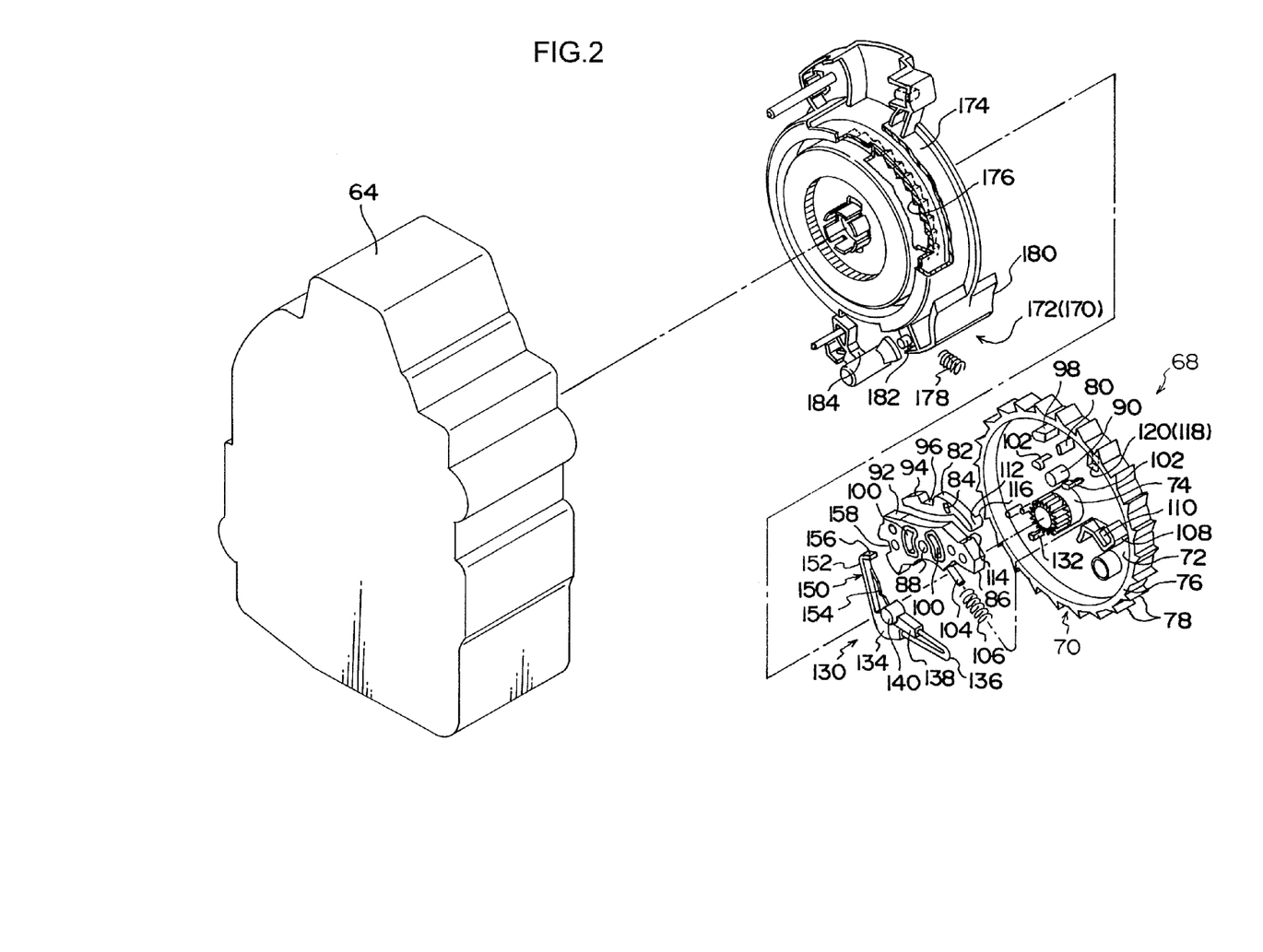
FIG. 2 is an exploded perspective view showing the configuration of a locking unit which constitutes the webbing take-up device related to the one embodiment of the invention.
Figure 3:
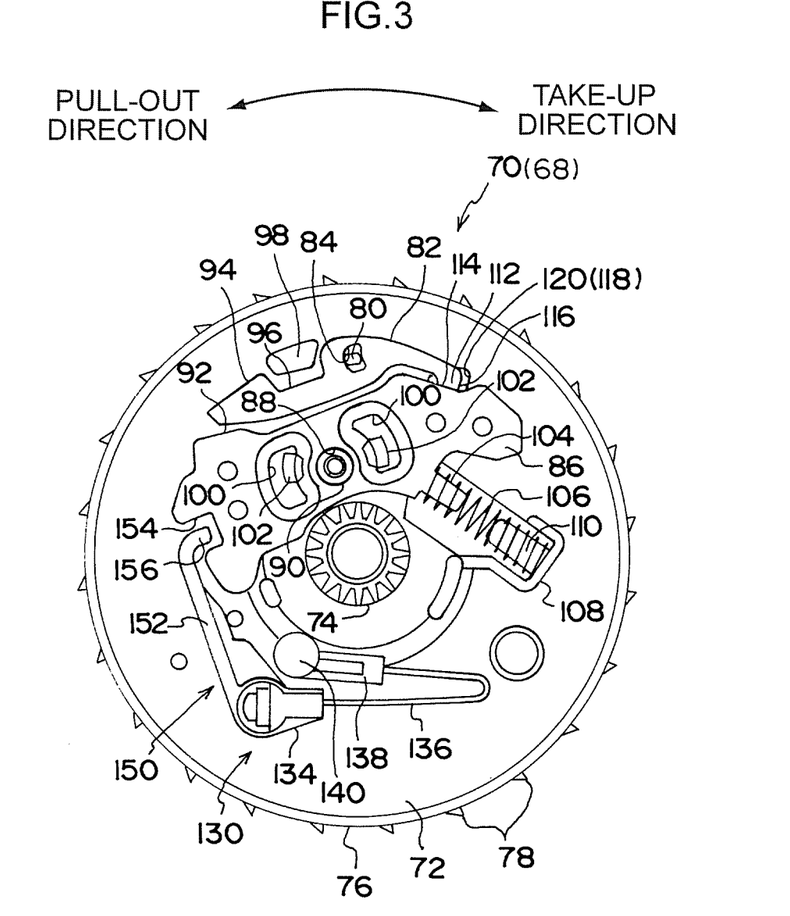
FIG. 3 is a front view showing the configuration of a rotational acceleration detecting unit.

Moreover, a V gear 70 serving as a second rotating body which constitutes a W sensor 68 serving as a rotational acceleration detecting unit is provided between the sensor holder 62 and the sensor cover 64. As shown in FIGS. 2 and 3, the V gear 70 includes a disk portion 72 of which the outer peripheral shape is circular. A circular hole is formed at the center of the disk portion 72 in the radial direction, and a cylindrical boss 74 corresponding to this circular hole is formed coaxially with the circular hole on the face of the disk portion 72 on the side of the sensor cover 64. The shaft portion 66 of the torsion shaft 28 passes through the circular hole and the boss 74, and the disk portion 72 of the V gear 70 is rotatably journalled around the shaft portion 66.

Additionally, a peripheral wall 76 is erected at least toward the sensor holder 62 from an outer peripheral portion of the disk portion 72 along the axial direction of the disk portion 72. The peripheral wall 76 is formed in the shape of a cylinder which is coaxial with the disk portion 72, and plural ratchet teeth 78 are formed at predetermined intervals on an outer peripheral portion of the peripheral wall. A supporting projection 80 is formed on a side of the boss 74 so as to project from the disk portion 72, and enters a through-hole 84 formed in a W pawl 82 serving as a rotation transmission member. The W pawl 82 is supported by the supporting projection 80 so as to be capable of oscillating around an axis which has almost the same direction as the central axis of the V gear 70 as its axial direction.

An inertia mass 86 serving as the inertial mass body is provided between the W pawl 82 and the boss 74. The inertia mass 86 is formed with a pin hole 88, and a support shaft 90 which is formed so as to project from the disk portion 72 between the boss 74 and the supporting projection 80 enters the pin hole 88. The support shaft 90 supports the inertia mass 86 so as to be capable of oscillating around the axis which has the same direction as the central axis of the V gear 70 as its axial direction. When the inertia mass 86 oscillates in the take-up direction with respect to the V gear 70 about the support shaft 90, a pressing portion 92 in the inertia mass 86 presses the W pawl 82. When the W pawl 82 is pressed by the pressing portion 92, the W pawl 82 oscillates so that an engaging claw 94 of the W pawl 82 approaches an inner peripheral portion of the peripheral wall 76. The engaging claw 94 is formed at the W pawl 82 so as to be closer to the pressing portion 92 than the formation position of the through-hole 84.

The W pawl 82 is formed with a recess 96 which opens toward the side opposite to the inertia mass 86, and a stopper 98 which is formed so as to project from the disk portion 72 enters the recess to regulate oscillation of the W pawl 82 within a certain range. Additionally, curved holes 100 which are curved so as to have the pin hole 88 as the center of curvature are formed on both sides of the pin hole 88 in the inertia mass 86. Stopper claws 102 which are formed so as to project from the disk portion 72 enter the curved holes 100, respectively, regulate oscillation of the inertia mass 86 within a certain range, and regulate the removal of the inertia mass 86 from the V gear 70.

In the inertia mass 86, a spring locking projection 104 is formed on the side opposite to the pressing portion 92 with the pin hole 88 therebetween, and the spring locking projection 104 enters one end of a compression coil spring 106 serving as a biasing means arranged inside the peripheral wall 76. A retaining wall 108 corresponding to the other end of the compression coil spring 106 is erected from the disk portion 72, and a spring locking projection 110 is formed so as to project toward the inertia mass 86 from the retaining wall 108.

The spring locking projection 110 enters the other end of the compression coil spring 106. The compression coil spring 106 abuts on the inertia mass 86 at one end thereof and abuts on the retaining wall 108 at the other end thereof, and the compression coil spring 106 biases the inertia mass 86 in a direction opposite to the oscillation direction of the inertia mass 86 when the pressing portion 92 presses the W pawl 82.

The end of the W pawl 82 opposite to the engaging claw 94 with the through-hole 84 therebetween is used as a pinched portion 112. In the inertia mass 86 biased by the compression coil spring 106, a pressure contact portion 114 is brought into pressure contact with the pinched portion 112. Moreover, a projection 116 is formed so as to project toward the disk portion 72 from the pinched portion 112. An interference hole 118 serving as a retaining portion is formed in the disk portion 72 so as to correspond to the projection 116. The interference hole 118 is formed so as to be sufficiently larger than the projection 116, and the inner peripheral portion thereof is used as a pinching surface 120. In the W pawl 82 in which the pinched portion 112 is brought into pressure contact with the pressure contact portion 114, the projection 116 is brought into pressure contact with the pinching surface 120. Thereby, the pinched portion 112 and the projection 116 are retained by the pressure contact portion 114 and the pinching surface 120.

Note that, in the present embodiment, the interference hole 118 is formed in the disk portion 72 of the V gear 70 and the inner peripheral portion of the interference hole 118 is used as the pinching surface 120. However, the pinching surface 120 of the inner peripheral portion of the interference hole 118 is not the only configuration which pinches the W pawl 82 along with the pressure contact portion 114 of the inertia mass 86. For example, a configuration in which the W pawl 82 is not formed with the projection 116, a projection-shaped or a wall-shaped protruding portion is erected from the disk portion 72 instead of the interference hole 118, and the W pawl 82 is pinched by the pressure contact portion 114 of the inertia mass 86 and the protruding portion on the disk portion 72 may be adopted.

Additionally, the end lock preventing member 130 is provided inside the peripheral wall 76. A support shaft 132 is erected from the disk portion 72 such that the end lock preventing member 130 is supported, and a base 134 of the end lock preventing member 130 is rotatably supported around the axis which has the same direction as the central axis of the V gear 70 as its axial direction. The base 134 is provided with a spring 136. The spring 136 is formed from a rod-shaped member having elasticity. The spring 136 has a longitudinal direction substantially orthogonal to the direction of the central axis of the V gear 70, and is bent or curved substantially in the shape of the letter U at an intermediate portion of the spring in the longitudinal direction.

A longitudinal base end of the spring 136 is mounted on the base 134. A friction pad 138 is attached to the tip of the spring 136. The friction pad 138 includes a pad portion 140. The pad portion 140 is formed, for example, in a columnar shape of which the axial direction is the same direction as the central axis of the V gear 70, and the shape of the pad portion 140 is set so that the end face of the pad portion opposite to the disk portion 72 of the V gear 70 projects further than the peripheral wall 76.

An arm portion 150 extends from the base 134. The arm portion 150 includes an arm main body 152. The arm main body 152 is formed in the shape of a narrow plate of which the width direction is almost the same direction as the central axis of the V gear 70 and the thickness direction is almost the same direction as the plane of the disk portion, and is adapted to be elastically deformable so as to be curved around an axis which has its axial direction in the width direction of the arm main body 152. Since a rib 154 is integrally formed in the thickness direction of the arm main body 152 closer to the base 134 than the longitudinal intermediate portion of the arm main body 152, the above elastic deformation is restrained within a range in which the rib 154 is formed in the arm main body 152.

The tip of the arm main body 152 extends to the lateral side of the inertia mass 86. Moreover, an engaging piece 156 extends toward the inertia mass 86 from a tip portion of the arm main body 152. An engaging recess 158 corresponding to the engaging piece 156 is formed in an outer peripheral portion of the inertia mass 86, and the engaging piece 156 enters the engaging recess 158. As the engaging piece 156 engages the inertia mass 86 inside the engaging recess 158, turning of the inertia mass 86 toward W pawl 82 is regulated.

In addition, the arm main body 152 is adapted to be elastically deformable around the axis which has same axial direction as the central axis of the V gear 70 and substantially the same direction as an oscillation axis of the inertia mass 86. A configuration may be adopted in which the arm main body 152 is split into two or more members in its longitudinal direction unlike the arm main body 152 formed from one member in the present embodiment. The plural split arm main bodies 152 are connected together with a spring material, and the whole arm main bodies 152 are elastically deformed by this spring material.

As shown in FIG. 2, a sensor gear 172 serving as the first rotating body is provided on the opposite side to the sensor holder of the V gear 70. The sensor gear 172 constitutes a locking mechanism main body portion 170 serving as a locking unit main body. The sensor gear 172 includes a sensor gear main body 174. The sensor gear main body 174 is formed in the shape of a substantially cylindrical shape which opens toward the V gear 70 and has a shallow bottom, and the end face of the pad portion 140 of the friction pad 138 of the end lock preventing member 130 comes into sliding contact with the bottom of the sensor gear main body 174. An inner peripheral portion of the sensor gear main body 174 is formed with a ratchet gear 176, and the engaging claw 94 of the W pawl 82 which is pushed up and turned by the pressing portion 92 of the inertia mass 86 meshes with the ratchet gear 176.

Additionally, the shaft portion 66 of the torsion shaft 28 passes coaxially through the sensor gear main body 174 of the sensor gear 172, and the sensor gear main body 174 is rotatably supported by the shaft portion 66. One end of a return spring 178 is locked to a part of the sensor gear 172. A tension coil spring is used as the return spring 178, and the other end of the return spring 178 is locked to the sensor cover 64, and biases the sensor gear 172 in the take-up direction when the sensor gear 172 has turned in a pull-out direction around the torsion shaft 28. For this reason, even if the spool 18 rotates, the sensor gear 172 does not rotate along with the spool 18. However, in a state where the pressing portion 92 of the W pawl 82 engages the ratchet gear 176, the V gear 70 cannot rotate relative to the spool 18. Therefore, when the V gear 70 rotates in the pull-out direction along with the spool 18, the sensor gear 172 also rotates in the pull-out direction.

Additionally, pressing portion 180 is formed toward the V gear 70 in the sensor gear main body 174. A shaft 182 is formed at the end of the pressing portion 180 opposite to the V gear 70 so as to protrude therefrom, and a coupling claw 184 serving as a coupling member is supported by the shaft 182 so as to be rotatable around an axis parallel to the axial direction of the torsion shaft 28. The coupling claw 184 turns and is brought close to or separated from the outer peripheral portion of the peripheral wall 76 of the V gear 70. When the V gear 70 is rotating in the pull-out direction in a state where the coupling claw 184 has been brought close to and engaged with the ratchet teeth 78, the rotation of the V gear 70 in the pull-out direction is transmitted to the sensor gear 172 via the coupling claw 184, and the sensor gear 172 rotates in the pull-out direction along with the V gear 70.

Moreover, a V sensor 210 serving as a vehicle acceleration detecting unit shown in FIG. 2 is provided below the coupling claw 184. The sensor holder 62 is formed with a box-shaped receiving portion 212 which opens toward the sensor cover 64 so as to correspond to the V sensor 210, and at least a part of the V sensor 210 is accommodated in the receiving portion 212. The V sensor 210 includes a sensor frame 214. The sensor frame 214 includes a pair of wall portions 216 which face each other substantially in the lateral direction of the vehicle. From the respective wall portions 216, shafts 218 extend coaxially with each other outward in the facing direction of the wall portions 216, and are supported by support holes formed in the walls of the receiving portion 212 of the sensor holder 62.

A placing portion 220 is provided between the pair of wall portions 216. The placing portion 220 is formed with a curved surface which is recessed downward or a conical slope which opens upward, and a hard ball 228 serving as an inertial mass body in the V sensor 210 is placed inside the curved surface or the slope. A sensor claw 230 serving as a claw portion is provided above the hard ball 228. A tip of the sensor claw is located at one of the pair of wall portions 216, and a base end of the sensor claw is journalled by the other of the pair of wall portions 216 so as to be rotatable around an axis which has substantially the longitudinal direction of the vehicle as its axial direction.

As the hard ball 228 rolls and rises on the curved surface of the placing portion 220, the sensor claw 230 is pushed up. When the sensor claw 230 is pushed up by the hard ball 228, the claw portion 232 is turned so as to abut on the coupling claw 184 of the sensor gear 172 and push up the coupling claw 184. The V gear 70 is located in the turning direction of the coupling claw 184 which has turned due to the engagement of the claw portion 232, and thereby, the coupling claw 184 meshes with the ratchet teeth 78 of the V gear 70.

As shown in FIG. 1, the locking mechanism 60 further includes a locking pawl 260 as a locking member. The locking pawl 260 includes a pair of shafts 262. The shafts 262 have an axial direction parallel to the axial direction of the spool 18, the tip of one shaft 262 is rotatably supported by a bearing hole (not shown) formed in the leg plate 16, and the tip of the other shaft 262 is turnably journalled by the sensor holder 62. The other shaft 262 is formed with a pawl portion 264. The pawl portion 264 is a plate-shaped member which has a thickness direction along the axial direction of the shafts 262, and a part of a periphery of the pawl portion 264 is formed with ratchet teeth which are external teeth.

A locking base 280 is provided at a side of the pawl portion 264. The locking base 280 includes a fitting and insertion portion 282. The fitting and insertion portion 282 is formed in a columnar shape and is rotatably fitted and inserted into the other end of the through-hole 22 of the spool 18 coaxially with the spool 18. The torsion shaft 28 coaxially passes through the fitting and insertion portion 282 in a state where the torsion shaft is prohibited from relative rotation to the locking base 280, and the locking base 280 rotates coaxially and integrally with the torsion shaft 28. In the locking base 280, the ratchet portion 284 is formed with the fitting and insertion portion 282. The ratchet portion 284 is formed coaxially with the fitting and insertion portion 282, and ratchet teeth are intermittently formed on an outer peripheral portion of the ratchet portion.

As the shafts 262 of the locking pawl 260 turn in the take-up direction, the ratchet teeth of the pawl portion 264 mesh with the ratchet teeth of the ratchet portion 284 of the locking base 280. In a state where the pawl portion 264 and the ratchet portion 284 engage each other, the rotation of the ratchet portion 284, that is, the locking base 280 in the pull-out direction is regulated. Additionally, the pressing portion 180 of the sensor gear 172 shown in FIG. 2 corresponds to the pawl portion 264 and when the sensor gear main body 174 of the sensor gear 172 turns in the pull-out direction, the pressing portion 180 presses the pawl portion 264 thereby turning the locking pawl 260 in the take-up direction.

The locking base 280 is formed with a clutch hole 286. The clutch hole 286 opens to the end face of the ratchet portion 284 opposite to the fitting and insertion portion 282, and the torsion shaft 28 passes through the clutch hole. When the pinion 46 of the pretensioner 36 rotates in the take-up direction, and the clutch 48 rotates in the take-up direction along with this rotation, a part of the clutch 48 engages the inner peripheral portion of the clutch hole 286, and the locking base 280 is rotated in the take-up direction.

Operation of Present Embodiment

Next, the operation of the present webbing take-up device 10 will be described.

In the present webbing take-up device 10, when the webbing belt 24 which has been taken up around the spool 18 is pulled out against the biasing force of the spiral spring 32, the spool 18 rotates in the pull-out direction and the webbing belt 24 is pulled out. The webbing belt 24 which has been pulled out is put around a passenger's body, and a tongue plate provided at the longitudinal intermediate portion of the webbing belt 24 is retained by a buckle device provided at a side of a seat of the vehicle. This results in the webbing belt 24 being attached around the passenger's body, and consequently, the passenger's body is constrained by the webbing belt 24.

In the attached state of the webbing belt 24, when the vehicle is in an abrupt deceleration state and the hard ball 228 is caused to roll thereby, the sensor claw 230 is pushed up by the hard ball 228 of the V sensor 210. The sensor claw 230 engages the coupling claw 184 of the sensor gear 172 and pushes up and turns the coupling claw 184. Thereby, the coupling claw 184 meshes with the ratchet teeth 78 of the V gear 70.

When the passenger's body moves substantially toward the front side of the vehicle due to the inertia when the vehicle decelerates, the webbing belt 24 is abruptly pulled by the passenger's body. As the webbing belt 24 is abruptly pulled in this way, a rotating force in the pull-out direction is abruptly applied to the spool 18. When the torsion shaft 28 and the V gear 70 rotate in the pull-out direction as the spool 18 rotates in the pull-out direction, the inertia mass 86 rotates in the pull-out direction along with the V gear 70.

Figure 4:
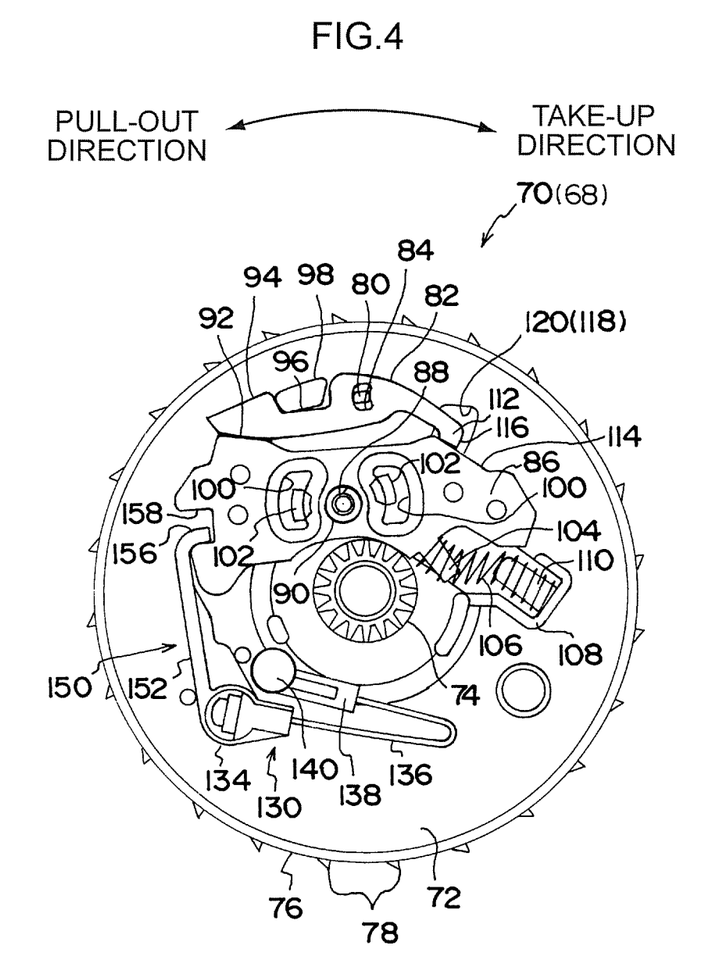
FIG. 4 is a front view corresponding to FIG. 3, showing a state where a rotation transmission member has been pressed and moved against an inertial mass body.

However, when the V gear 70 rotates abruptly in the pull-out direction, the inertia mass 86 remains in the initial position without rotating due to its inertia, and cannot follow the rotation of the V gear 70. As a result, as shown in FIG. 4, relative displacement is generated against the biasing force of the compression coil spring 106 between the V gear 70 which rotates in the pull-out direction, and the inertia mass 86 which cannot follow the rotation of the V gear. When the relative oscillation of the inertia mass 86 to the V gear 70 is generated in this way, the pressing portion 92 of the inertia mass 86 pushes up the W pawl 82, thereby turning the engaging claw 94 of the W pawl 82 in a direction which the engaging claw is brought close to the inner peripheral portion of the peripheral wall 76. When the W pawl 82 turns in this way, the engaging claw 94 of the W pawl 82 meshes with the ratchet gear 176 formed at the inner peripheral portion of the sensor gear main body 174 (sensor gear 172).

When the V gear 70 rotates in the pull-out direction in at least one state of the states where the engaging claw 94 of the W pawl 82 has meshed with the ratchet gear 176 of the sensor gear 172 and where the coupling claw 184 of the sensor gears 172 has meshed with the ratchet teeth 78 of the V gear 70, the rotation of the V gear 70 is transmitted to the sensor gear 172, and the sensor gear 172 turns in the pull-out direction along with the V gear 70 against the biasing force of the return spring 178.

When the sensor gear 172 turns in the pull-out direction by a certain angle, the pressing portion 180 presses the pawl portion 264 of the locking pawl 260, thereby turning the pawl portion 264 around the shafts 262. When the pawl portion 264 turns around the shafts 262, the pawl portion 264 meshes with the ratchet portion 284 of the locking base 280, regulates the rotation of the locking base 280 and the spool 18 in the pull-out direction, and suppresses the pullout of the webbing belt 24. Thereby, the passenger's body moving substantially toward the front direction of the vehicle due to its inertia can be reliably constrained and retained by the webbing belt 24.

Here, as shown in FIG. 3, in the present webbing take-up device 10, the pressure contact portion 114 of the inertia mass 86 presses the pinched portion 112 of the W pawl 82 with the biasing force of the compression coil spring 106, and biases the pinched portion in a direction in which the engaging claw 94 is separated from the inner peripheral portion of the peripheral wall 76 that is, in a direction in which the engaging claw 94 does not engage the ratchet gear 176 of the sensor gear 172. Moreover, since the projection 116 of the W pawl 82 enters the interference hole 118 formed in the disk portion 72 of the V gear 70, the projection 116 of the W pawl 82 pressed against the pressure contact portion 114 of the inertia mass 86 is brought into pressure contact with the pinching surface 120 of the interference hole 118.

Thereby, the pinched portion 112 and projection 116 of the W pawl 82 are pinched and retained by the pressure contact portion 114 of the inertia mass 86 and the pinching surface 120 of the interference hole 118 in a state where the inertia mass 86 does not oscillate against the biasing force of the compression coil spring 106. Accordingly, in a usual condition, the W pawl 82 does not oscillate greatly due to the rotation of the V gear 70 when the webbing belt 24 is pulled out from the spool 18 or the spool 18 is made to take up the webbing belt 24, and generation of noise resulting from unnecessary oscillation of the W pawl 82 can be prevented or effectively suppressed.

Additionally, since the pressure contact portion 114 of the inertia mass 86 presses the pinched portion 112 of the W pawl 82, the turning of the inertia mass 86 caused by the biasing force of the compression coil spring 106 is regulated by the inner peripheral portion of the pinching surface 120 of the interference hole 118 via the pinched portion 112. That is, in a normal state, the inertia mass 86 is pinched and retained by the compression coil spring 106 and the pinched portion 112 of the W pawl 82, and further the pinching surface 120 of the interference hole 118. As a result, unnecessary oscillation of the inertia mass 86 can be suppressed.

In a case in which the V gear 70 has rotated in the take-up direction along with the spool 18 with the biasing force of the spiral spring 32, the V gear 70 rotates in the take-up direction relative to the sensor gear 172. For this reason, friction is caused between the pad portion 140 of the end lock preventing member 130 and the bottom of the sensor gear 172 with which the pad portion 140 is brought into pressure contact, and thereby, the end lock preventing member 130 turns in the pull-out direction around the support shaft 132.

Figure 5:
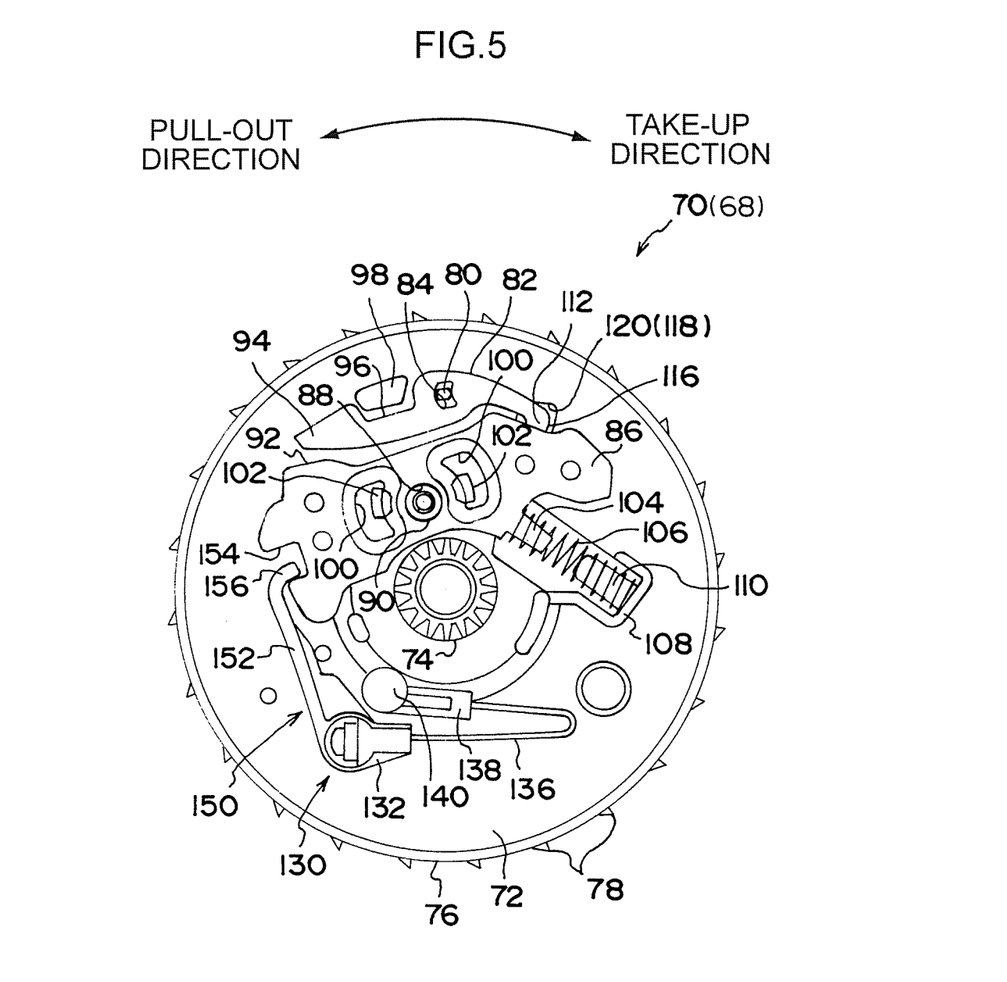
FIG. 5 is a front view corresponding to FIG. 3, showing a state where an end lock preventing member has been elastically deformed while regulating the movement of the inertial mass body.

Due to the turning of the end lock preventing member 130, as shown in FIG. 5, the engaging piece 156 of the arm portion 150 pulls the inner wall of the engaging recess 158 of the inertia mass 86, and regulates the oscillation of the inertia mass 86 in the take-up direction around the support shaft 90. That is, the oscillation of the inertia mass 86 in a direction in which the pressing portion 92 presses the W pawl 82 is restrained. Moreover, if the inertia mass 86 tends to oscillate in the take-up direction when the rotation of the V gear 70 in the take-up direction is completed, the engaging piece 156 interferes with the inner wall of the engaging recess 158, thereby regulating the oscillation of the inertia mass 86.

When the spool 18 rotates in the take-up direction and reaches a state where the webbing belt 24 is entirely stored, that is, the state where the spool cannot take up the webbing belt 24 any more, the spool 18 stops suddenly, the inertia mass 86 oscillates due to its inertia at that time, and the engaging claw 94 of the W pawl 82 meshes with the ratchet gear 176 of the sensor gear 172, whereby a so-called "end lock state" is brought out. Thereafter, it becomes difficult to pull out the webbing belt 24. However, as described above, in the webbing take-up device 10, when the rotation of the V gear 70 in the take-up direction has suddenly stopped, the oscillation of the inertia mass 86 is regulated by the engaging piece 156. Thus, occurrence of the "end lock state" can be prevented or effectively suppressed.

Additionally, when the inertia mass 86 tends to turn in the take-up direction by a relatively large rotating force in a state after the engaging piece 156 has interfered with the inner wall of the engaging recess 158, the arm main body 152 is elastically deformed around the axis in the width direction of the arm portion 150 while the interference of the engaging piece 156 with the inner wall of the engaging recess 158 being maintained, whereby the force that the engaging piece 156 and the arm portion 150 receives from the inertial mass 86 is absorbed. Thereby, occurrence of unexpected bending of the arm main body 152 or the engaging piece 156 can be prevented, and the operation of the end lock preventing member 130 or the V gear 70 can be maintained well for a prolonged period of time.

Additionally, in the present embodiment, interference hole 118 is formed as a retaining portion and projection 116 is pinched by the pinching surface 120 and inertia mass 86. However, the retaining portion is not limited to interference hole 118 and inner periphery of interference hole 118. As indicated in FIGS. 6 and 7, an abutting wall portion 192 is formed along the inner periphery of the interference hole 118 at a location which is opposite to the location where the inertia mass 86 abuts with projection 116 such that the retaining portion is configured to include the abutting wall portion 192.

According to the above configuration, an abutting area to the projection 116 is increased by the abutting wall portion 192. As indicated in FIG. 7, the abutting wall portion 192 is formed such that at least a portion of the abutting wall portion faces toward an direction in which the inertia mass 86 moves (an arrow D direction in FIG. 7) when the inertia mass 86 contacts with the projection. At an area S in the direction of the interference hole 118 to be provided, the projection 116 is retained by the abutting wall portion 192 and the inertia mass 86.

Even if the inertia mass 86 presses the projection 116, at the pressing direction of the inertia mass 86, the abutting wall portion 192 supports the projection 116. Accordingly, inclination of the projection 116 and the W pawl 82 due to being pressed by the inertia mass 86 is effectively sustained.

Figure 6:
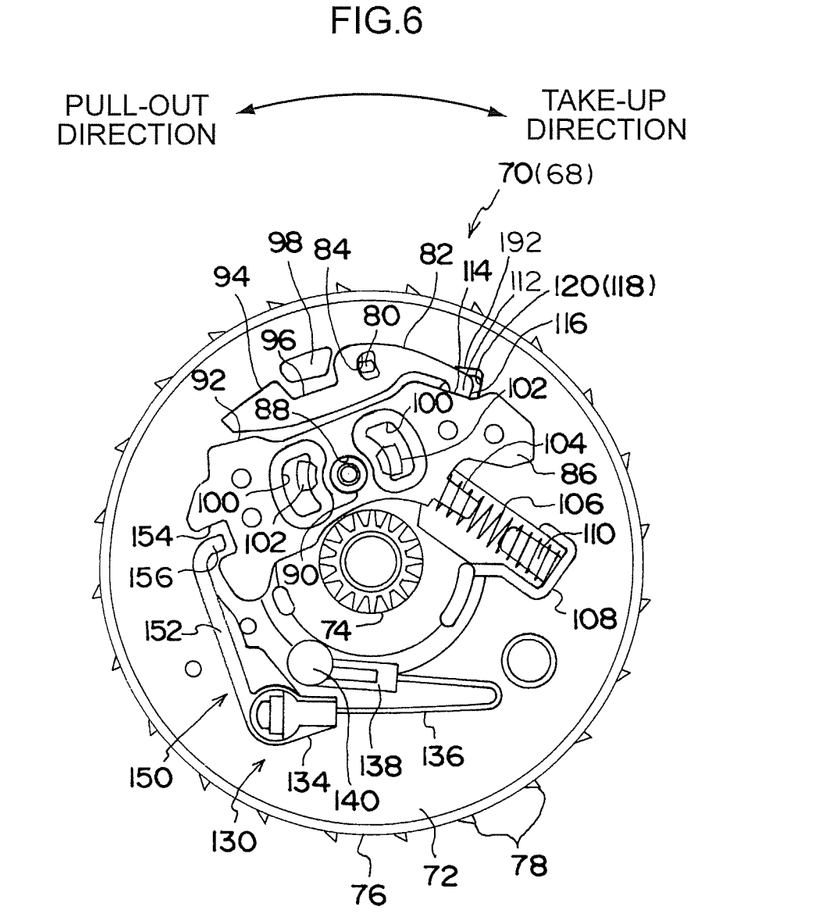
FIG. 6 is a front view corresponding to FIG. 3, showing another embodiment in which the a rotational acceleration detecting unit is modified.
Figure 7:
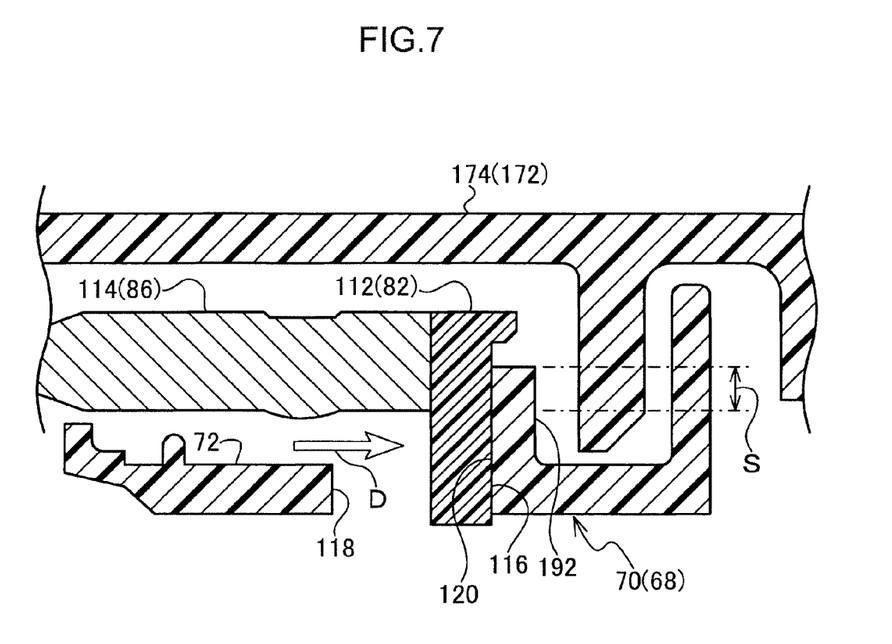
FIG. 7 is a sectional view showing the modified rotational acceleration detecting unit.

Note that in a modified embodiment as indicated in FIGS. 6 and 7, the retaining portion is configured with the interference hole 118 and the abutting wall portion 192. However, it is sufficient that the retaining portion can support the W pawl 82 by pinching with the inertia mass 86. For example, such a modification may be employed as only the abutting wall portion 192 is formed as the retaining portion without forming the interference hole 118 on the disk portion 72 of the V gear 70.

As described above, the webbing take-up device related to the invention can prevent or suppress unnecessary movement of the rotation transmission member which constitutes the rotational acceleration detecting unit.

What is claimed is:

1. A webbing take-up device comprising:
a spool having a longitudinal base end of a webbing belt locked thereto and taking up the webbing belt by rotation of the spool in a take-up direction; and
a locking unit having a locking unit main body that is operated by rotation of a first rotating body in a predetermined direction so as to regulate rotation of the spool in a pull-out direction that is opposite to the take-up direction, and having a rotational acceleration detecting unit that is operated by rotation of the spool in the pull-out direction at an acceleration of greater than or equal to a predetermined value so as to rotate the first rotating body in the predetermined direction,
wherein the rotational acceleration detecting unit comprises:
a second rotating body that rotates in the predetermined direction due to rotation of the spool in the pull-out direction and that is provided with a retaining portion;
a rotation transmission member provided at the second rotating body so as to be capable of being brought closer to and further separated from the first rotating body, and transmitting the rotation of the second rotating body in the predetermined direction to the first rotating body in a state in which the rotation transmission member is engaged with the first rotating body;
an inertial mass body having a pressing portion and provided at the second rotating body, and rotating in a direction opposite to the predetermined direction relative to the second rotating body, whereby the pressing portion presses the rotation transmission member to make the rotation transmission member engage with the first rotating body; and
a biasing means provided at the second rotating body to bias the inertial mass body in the predetermined direction, whereby the inertial mass body pressure contacts the rotation transmission member and biases the rotation transmission member via a biasing force so as to move apart from the first rotating body, and the biasing means further allowing relative rotation to be produced between the second rotating body and the inertial mass body against the biasing force when the second rotating body has rotated in the predetermined direction at an acceleration greater than or equal to the predetermined value;
wherein the retaining portion pinches the rotation transmission member together with the inertial mass body biased by the biasing means, thereby retaining the rotation transmission member in a state in which the rotation transmission member does not engage with the first rotating body, and to release retention of the rotation transmission member when relative rotation is produced between the second rotating body and the inertial mass body, and
wherein a projection is formed on the rotation transmission member that projects toward the second rotating body along the direction of a rotation axis of the second rotating body, the second rotating body is formed with a hole portion into which the projection enters and is pressure contacted by an inner peripheral portion thereof as the rotation transmission member is pressed by the inertial mass body by the biasing force of the biasing means, and the inner peripheral portion of the hole portion serves as the retaining portion,
wherein the projection is formed at one end portion in a length direction of the rotation transmission member.

2. The webbing take-up device according to claim 1, wherein a portion of the inertia mass body and a portion of the retaining portion face each other when the rotation transmission member is retained by the inertia mass body and the retaining portion.

3. The webbing take-up device according to claim 1, wherein the rotation transmission member is directly contacted by the inertial mass body which pushes the projection against the inner peripheral portion of the hole portion that serves as the retaining portion.

4. A webbing take-up device comprising:
a spool having a longitudinal base end of a webbing belt locked thereto and taking up the webbing belt by rotation of the spool in a take-up direction; and
a locking unit having a first rotating body, a locking unit main body and a rotational acceleration detecting unit, the locking unit main body being operated by rotation of the first rotating body in a pull-out direction of the webbing belt so as to regulate rotation of the spool in the pull-out direction, and the rotational acceleration detecting unit being operated by rotation of the spool in the pull-out direction at an acceleration of greater than or equal to a predetermined value so as to rotate the first rotating body in the pull-out direction,
wherein the rotational acceleration detecting unit comprises:
a second rotating body that rotates in the pull-out direction due to rotation of the spool in the pull-out direction and that is provided with a retaining portion;
a rotation transmission member provided so as to be brought closer to and further separated from the first rotating body, and transmitting the rotation of the second rotating body in the pull-out direction to the first rotating body in a state in which the rotation transmission member is engaged with the first rotating body;
an inertial mass body having a pressing portion and rotating relative to the second rotating body rotating in the pull-out direction, whereby the pressing portion presses the rotation transmission member to make the rotation transmission member engage with the first rotating body; and a biasing means provided at the second rotating body and biasing the inertial mass body, whereby the inertial mass body pressure contacts the rotation transmission member and biases the rotation transmission member via a biasing force so as to move apart from the first rotating body, and the biasing means further allowing relative rotation to be produced between the second rotating body and the inertial mass body against the biasing force when the second rotating body has rotated in the pull-out direction at an acceleration greater than or equal to the predetermined value;

wherein the retaining portion pinches the rotation transmission member together with the inertial mass body biased by the biasing means, thereby retaining the rotation transmission member in a state in which the rotation transmission member does not engage with the first rotating body, and to release retention of the rotation transmission member when relative rotation is produced between the second rotating body and the inertial mass body, and wherein a projection is formed on the rotation transmission member so as to project toward the second rotating body along the direction of a rotation axis of the second rotating body, the second rotating body is formed with a hole portion into which the projection enters, an inner peripheral portion of the hole portion serves as the retaining portion, and the projection is brought into pressure contact with the inner peripheral portion of the hole portion when the rotation transmission member is pressed by the inertial mass body by the biasing force of the biasing means, wherein the projection is formed at one end portion in a length direction of the rotation transmission member.

5. The webbing take-up device according to claim 4, wherein a portion of the inertia mass body and a portion of the retaining portion face each other when the rotation transmission member is retained by the inertia mass body and the retaining portion.

* * * * *